(12) United States Patent
Chuprevich

(10) Patent No.: US 12,294,588 B1
(45) Date of Patent: May 6, 2025

(54) SYSTEMS AND METHODS FOR PROCESSING THIRD-PARTY COMMUNICATIONS

(71) Applicant: Wells Fargo Bank, N.A., San Francisco, CA (US)

(72) Inventor: John Chuprevich, Davidson, NC (US)

(73) Assignee: Wells Fargo Bank, N.A., San Francisco, CA (US)

(*) Notice: Subject to any disclaimer, the term of this patent is extended or adjusted under 35 U.S.C. 154(b) by 232 days.

(21) Appl. No.: 18/150,388

(22) Filed: Jan. 5, 2023

(51) Int. Cl.
  *H04L 9/40* (2022.01)
  *H04L 51/046* (2022.01)

(52) U.S. Cl.
  CPC .......... *H04L 63/126* (2013.01); *H04L 51/046* (2013.01); *H04L 63/123* (2013.01)

(58) Field of Classification Search
  CPC ... H04L 63/126; H04L 51/046; H04L 63/123; H04L 9/40
  USPC ........................................................ 713/168
  See application file for complete search history.

(56) References Cited

U.S. PATENT DOCUMENTS

| | | | | |
|---|---|---|---|---|
| 8,103,875 B1* | 1/2012 | Ramzan | ............. | H04L 63/0236 713/180 |
| 10,021,114 B1* | 7/2018 | Liu | ....... | H04L 63/123 |
| 12,101,352 B1* | 9/2024 | Opos | .................. | H04L 63/1416 |
| 2006/0125611 A1* | 6/2006 | Schmid | ............... | G08B 29/185 340/438 |
| 2010/0100465 A1* | 4/2010 | Cooke | ................... | H04L 9/3297 726/5 |
| 2011/0002459 A1* | 1/2011 | Kim | ...................... | H04L 63/126 380/28 |
| 2012/0158870 A1* | 6/2012 | Nussey | ................. | H04L 51/063 709/206 |
| 2014/0173707 A1* | 6/2014 | Hollander | ............... | H04L 63/10 726/7 |
| 2019/0132273 A1* | 5/2019 | Ryan | .................... | H04L 63/1483 |
| 2020/0279225 A1* | 9/2020 | Li | ........................ | H04L 63/0245 |
| 2021/0203653 A1* | 7/2021 | Kochhar | ................. | H04L 63/20 |
| 2021/0258345 A1* | 8/2021 | Wardman | .............. | H04L 67/306 |
| 2022/0078184 A1* | 3/2022 | Traynor | ............... | H04W 12/069 |

(Continued)

OTHER PUBLICATIONS

"Send Branded Texts with Verified SMS", Google Verified SMS, Web page <https://www.text-em-all.com/google-verified-sms#:~:text=Verified>, retrieved from Internet Archive Wayback Machine <https://web.archive.org/web/20220926064812/https://www.text-em-all.com/google-verified-sms> on Jan. 4, 2022 (4 Pages).

(Continued)

*Primary Examiner* — Sargon N Nano
(74) *Attorney, Agent, or Firm* — K&L Gates LLP

(57) ABSTRACT

Systems, apparatuses, methods, and computer program products are disclosed for processing third-party communications. In particular, a method includes: receiving, by communications hardware, a message to be transmitted to a message target device; determining, by a verification engine, that the message is legitimate; appending, by a badge generation engine, a verification badge to the message to obtain a verified message; and transmitting, by an in-application (in-app) messaging engine and via a secured in-app messaging channel, the verified message to the message target device to be displayed on the message target device via an application executing on the message target device.

20 Claims, 3 Drawing Sheets

(56) References Cited

U.S. PATENT DOCUMENTS

| | | | |
|---|---|---|---|
| 2022/0103496 A1* | 3/2022 | Calhoun | G06Q 10/107 |
| 2023/0007449 A1* | 1/2023 | Mumick | H04L 69/24 |
| 2023/0086556 A1* | 3/2023 | Himler | H04L 63/1441 |
| | | | 726/23 |

OTHER PUBLICATIONS

"How Verified SMS works", Verified SMS Docs. Google Developers, Web page <https://developers.google.com/business-communications/verified-sms/guides/learn#:~:text=When> (7 Pages).
"Send trustworthy business messages with Verified SMS", Verified SMS Docs, Google Developers, Web page <https://developers.google.com/business-communications/verified-sms> (2 Pages).

\* cited by examiner

SYSTEMS AND METHODS FOR PROCESSING THIRD-PARTY COMMUNICATIONS

BACKGROUND

Computing devices may be used to send communications (e.g., short message service (SMS) messages, emails, online correspondences, or the like) between individuals. However, not all communications may be safe to open or access.

BRIEF SUMMARY

Generally, texts (e.g., SMS, iMessage®, or the like) and emails have become an integral part of human communication. However, advancements in technology have enabled bad actors (e.g., scam artists) to deceive individuals (e.g., through use of deceptive text messages, phishing emails, or the like) into providing sensitive information (e.g., personal identity information, financial information, or the like). For example, scam artists are now able to hide suspicious links using short form uniform record locators (URLs) containing the names of reputable companies (e.g., Wells Fargo, Duke Energy, or the like) that do business with an individual. Individuals may then be deceived into thinking that these short form URLs are safe to access, leading to their devices (e.g., mobile phones, computers, company servers, or the like) and sensitive information being compromised. Thus, there is a growing concern that third-party communications received by individuals are being less secure and safe. The inventors have realized these issues concerning third-part communications and have now proposed new systems, apparatuses, and methods for processing (e.g., verifying, marking, securely transmitting, or the like) third-party communications.

In particular, systems, apparatuses, methods, and computer program products are disclosed herein for enabling processing of third-party communications to increase security and safety of these third-party communications. More specifically, embodiments herein provide increased trust in third-party communications by having a trusted source (e.g., a user's financial institution) (also referred to herein as a "first entity") first verify third-party communications that are meant to be transmitted to an individual. Once the third-party communications are verified, the verified third-party communications may be transmitted using a secured in-application (in-app) messaging channel operated by the trusted source. Individuals may then access these verified third-party communications through one or more applications (e.g., mobile applications, web-based applications, or the like) managed (e.g., hosted) by the trusted source. Because these applications are protected with a high level of security and are directly managed (e.g., hosted) by the trusted source, individuals are advantageously provided with peace of mind that the third-party communications were not sent by a scam artist but rather sent directly (e.g., in the form of second-hand communication) by the trusted source. As a result, use of the third-party communications processing process of one or more embodiments can not only mitigate the above-discussed issues (e.g., loss of sensitive information to third-party communications sent by bad actors), but also cause a direct improvement in the field of electronic communication technology (namely, through the improved security and safety of electronic communications).

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
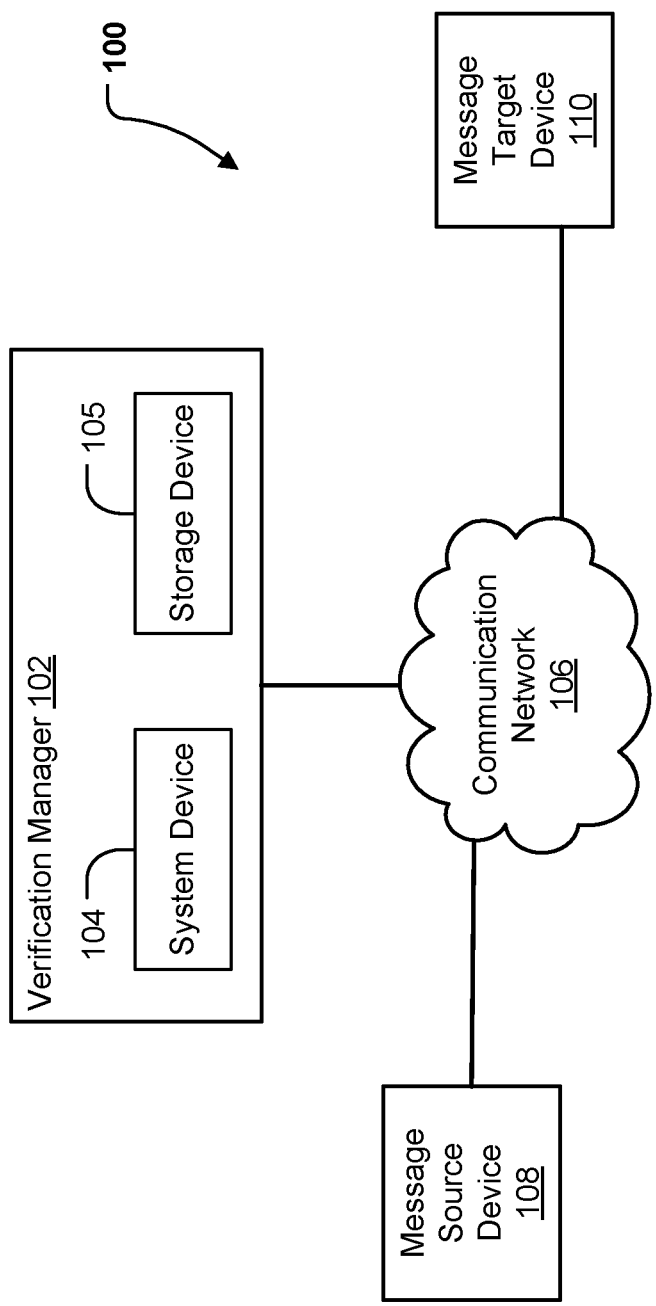
FIG. 1 illustrates a system in which some example embodiments may be used.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

Methods, apparatuses, systems, and computer program products are described herein that provide for processing third-party communications. Traditionally, it is difficult to regulate and control how an individual receives electronic communications (e.g., electronic communications from one or more entities providing services to the individual). In most cases, such entities would transmit electronic communications (e.g., text messages, emails, or the like) directly to the individual, which makes it easy for bad actors (e.g., scam artists) to pose as these entities. For example, an individual may be receiving services from an electricity provider and may have a contractual agreement to pay the electricity provider for receiving said services. Once bad actors identify this relationship between the individual and the electricity provider, they are able to easily pose as the electricity provider (e.g., through text messages and emails including a name and/or logo of the electricity provider, or the like) to deceive the individual into providing sensitive information (e.g., the individual's social security number, payment card number, financial account information, or the like). In fact, in the year twenty-twenty (2020) alone, nearly $86 million was reported lost from frauds originating in scam texts.

In contrast to conventional techniques in the field of electronic communications, example embodiments described herein enable a source trusted by the individual (referred to above and hereinafter as a "trusted source") to first receive and verify electronic communications that are meant to be transmitted to the individual (referred to above and hereinafter as "third-party communications"). The verified third-party communications would then be transmitted by the trusted source through a secure in-application (in-app) messaging channel operated and maintained by the trusted source. To view the verified third-party communications, the individual may then be required to access (e.g., log in to) an application (e.g., a mobile application, a web-based application, or the like) managed (e.g., hosted) by the trusted source. For example, in some embodiments, the verified third-party communications would be available to the individual through an in-application message center (e.g., an inbox of an email system native to the application, a text message of an internal text message system native to the application, or the like).

In some embodiments, the verified third-party communications (hereinafter also referred to as a "verified message"), may further be appended with a verification badge associated (e.g., generated by) the trusted source. The verification badge may comprise one or more of: a logo of the trusted source, an indicator (e.g., a short message) indicating that the message is verified by the trusted source, or the like.

In some embodiments, the trusted source may determine whether the received third-party communications (hereinafter also simply referred to as "message") is legitimate by verifying one or more or of: an internet protocol (IP) address of a message source device; a content of the message, a time at which the message is received by the trusted source, or the like.

In some embodiments, messages identified by the trusted source as being not legitimate may be immediately deleted by the trusted source. Alternatively, additional processes (e.g., additional verification processes such as directly contacting the message source by the trusted source, or the like) may be executed to further verify a message marked as illegitimate before the message is deleted by the trusted source.

Such processing of electronic communications by one or more embodiments disclosed herein advantageously creates the perception that the electronic communication (e.g., a message) generated by the third-party is being sent directly by the trusted source, which directly improves a level of trust and safety associated with the electronic communication. In particular, the inventors have identified that trusted sources such as a user's financial institution (e.g., a bank) afford a level of trust and credibility to an individual that is often not shared by other sources (e.g., utility providers, contractors, restaurants, or the like) (also referred to herein as a "second entity"). As a result, use of the third-party communications processing process of one or more embodiments can not only mitigate the above-discussed issues (e.g., loss of sensitive information to third-party communications sent by bad actors) associated with conventional technology, but also cause a direct improvement in the field of electronic communication technology (namely, through the improved trust, security, and safety of electronic communications).

Although a high-level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment 100 within which various embodiments may operate. As illustrated, the environment 100 may include a verification manager 102 including a system device 104 and a storage device 105, a communications network 106 (e.g., the Internet, a cellular network, a combination of both, or the like), a message source device 108, and a message target device 110. Although system device 104, storage device 105, message source device 108, and message target device 110 are described in singular form, some embodiments may utilize more than one of these components. Additionally, some embodiments of the verification manager 102 may not require a storage device 105 at all (e.g., the verification manager 102 will use the memory 204 of the apparatus 200 (e.g., the system device 104) discussed below in reference to FIG. 2). Whatever the implementation, the verification manager 102, and its constituent system device(s) 104 and/or storage device(s) 105 may receive and/or transmit information via communications network 106 with any number of other devices, such as one or more computing devices (not shown).

System device 104 may be implemented as one or more servers, which may or may not be physically proximate to other components of the environment 100. Furthermore, some components of system device 104 may be physically proximate to the other components of the verification manager 102 while other components are not. System device 104 may receive, process, generate, and transmit data, signals, and electronic information to facilitate the operations of the verification manager 102. Particular components of system device 104 are described in greater detail below with reference to apparatus 200 in connection with FIG. 2.

Storage device 105 may comprise a distinct component from system device 104, or may comprise an element of system device 104 (e.g., memory 204, as described below in connection with FIG. 2). Storage device 105 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 106). Storage device 105 may host the software executed to operate the verification manager 102. Storage device 105 may store information relied upon during operation of the verification manager 102, such as various verification information (e.g., list of approved internet protocol (IP) addresses, list of trusted third-party entities, list of trusted emails, list of trusted phone numbers, list of predetermined safety/security rules, or the like), and/or other information that may be used by the verification manager 102, data and documents to be analyzed using the verification manager 102, or the like. In addition, storage device 105 may store control signals, device characteristics, and access credentials enabling interaction between the verification manager 102 and one or more of the message source device 108 and the message target device 110.

The verification manager 102 may be embodied by various computing devices known in the art, such as desktop or laptop computers, servers, server devices, or the like. For example, the verification manager 102 may be a server provisioned with software enabling the server to provide the methods of embodiments described herein for processing third-party communications. Additional components of the verification manager 102 and their respective functions are described in more detail below with reference to apparatus 200 in connection with FIG. 2.

The message source device 108 may be embodied by various computing devices known in the art, such as desktop or laptop computers, mobile phones (e.g., smart phones), tablets, servers, server devices, or the like. For example, the message source device 108 may be a server provisioned with software enabling the server to transmit one or more messages through communications network 106. Similar to the message source device 108, the message target device 110 may be embodied by various computing devices known in the art, such as desktop or laptop computers, mobile phones (e.g., smart phones), tablets, servers, server devices, or the like.

Although FIG. 1 illustrates an environment 100 and implementation in which the verification manager102 interacts with one or more of the message source device 108 and/or the message target device 110, in some embodiments users may directly interact (e.g., operate, control, modify, or otherwise interact to perform the various functions and achieve the various benefits described herein) with the verification manager 102 (e.g., via input/output circuitry of system device 104).

Example Implementing Apparatuses

Figure 2:
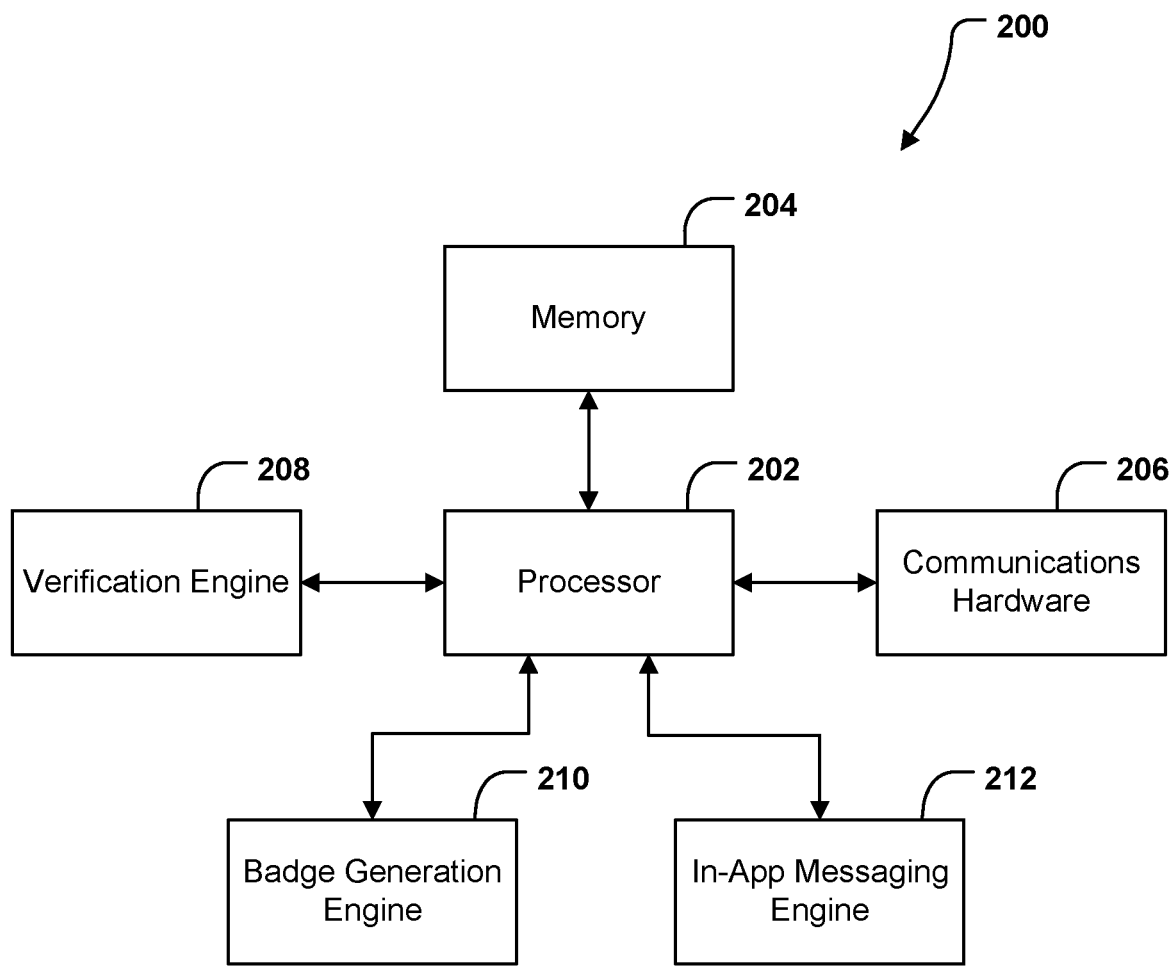
FIG. 2 illustrates a schematic block diagram of example circuitry embodying a device that may perform various operations in accordance with some example embodiments described herein.

System device 104 of the verification manager 102 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206 including input-output circuitry (not shown), verification engine 208, badge generation engine 210, and in-app messaging engine 212, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIG. 3.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on the storage device 105, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processor for causing transmission of such signals to a network or for handling receipt of signals received from a network. In some embodiments, the communications hardware 206 may include, for example, interfaces such as one or more ports (e.g., a laser port, a fiber-optic cable port, and/or the like) for enabling communications with other devices.

The communications hardware 206 may include input-output circuitry (not shown) configured to provide output to a user and, in some embodiments, to receive an indication of user input. It will be noted that some embodiments will not include input-output circuitry, in which case user input may be received via a separate device such as a separate client device or the like. The input-output circuitry of the communications hardware 206 may comprise a user interface, such as a display, and may further comprise the components that govern use of the user interface, such as a web browser, mobile application, dedicated client device, or the like. In some embodiments, the input-output circuitry may include a keyboard, a mouse, a touch screen, touch areas, soft keys, a microphone, a speaker, and/or other input/output mechanisms. The input-output circuitry may utilize the processor 202 to control one or more functions of one or more of these user interface elements through software instructions (e.g., application software and/or system software, such as firmware) stored on a memory (e.g., memory 204) accessible to the processor 202.

The apparatus 200 further comprises verification engine 208 that verifies one or more messages (e.g., electronic communications such as text messages, emails, or the like) received by the apparatus 200. The verification engine 208 may utilize processor 202, memory 204, or any other hardware component included in the apparatus 200 to perform these operations, as described in connection with FIG. 3 below. The verification engine 208 may further utilize communications hardware 206 to gather data from a variety of sources (e.g., message source device 108 and/or message target device 110, as shown in FIG. 1), may utilize input-output circuitry of the communications hardware 206 to receive data from a user, and in some embodiments may utilize processor 202 and/or memory 204 to verify one or more messages received by the apparatus. Additional details on how the verification engine 208 verifies messages is discussed below in reference to FIG. 3.

In addition, the apparatus further comprises badge generation engine 210 that generates one or more badges (e.g., verification badges) to be appended to messages that have been verified as legitimate messages by the verification engine 208. The badge generation engine 210 may utilize processor 202, memory 204, or any other hardware component included in the apparatus 200 to perform these operations, as described in connection with FIG. 3 below. The badge generation engine 210 may further utilize communications hardware 206 to gather data from a variety of sources (e.g., message source device 108 and/or message target device 110, as shown in FIG. 1), may utilize input-output circuitry of the communications hardware 206 to receive data from a user, and in some embodiments may utilize processor 202 and/or memory 204 to generate the one or more badges.

Finally, the apparatus 200 further comprises in-application (in-app) messaging engine 212 that manages a secured in-app messaging channel and causes transmission (e.g., by the communications hardware 206) of messages verified as legitimate by the verification engine 208 through the secured in-app messaging channel. The in-app messaging engine 212 may utilize processor 202, memory 204, or any other hardware component included in the apparatus 200 to perform these operations, as described in connection with FIG. 3 below. The in-app messaging engine 212 may further utilize communications hardware 206 to gather data from a variety of sources (e.g., message source device 108 and/or message target device 110, as shown in FIG. 1), may utilize input-output circuitry of the communications hardware 206 to receive data from a user, and in some embodiments may utilize processor 202 and/or memory 204 to manage the secured in-app messaging channel and to cause transmission of the verified messages through the secured in-app messaging channel.

Although components 202-212 are described in part using functional language, it will be understood that the particular implementations necessarily include the use of particular hardware. It should also be understood that certain of these components 202-212 may include similar or common hardware. For example, the verification engine 208, the badge generation engine 210, and the in-app messaging engine 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "engine" with respect to elements of the apparatus therefore shall be interpreted as necessarily including the particular hardware configured to perform the functions associated with the particular element being described. Of course, while the term "engine" should be understood broadly to include hardware, in some embodiments, the term "engine" may in addition refer to software instructions that configure the hardware components of the apparatus 200 to perform the various functions described herein.

Although the verification engine 208, the badge generation engine 210, and the in-app messaging engine 212 may leverage processor 202, memory 204, or communications hardware 206 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, or communications hardware 206 for enabling any functions not performed by special-purpose hardware elements. In all embodiments, however, it will be understood that the verification engine 208, the badge generation engine 210, and the in-app messaging engine 212 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. Thus, some or all of the functionality described herein may be provided by third party circuitry. For example, an apparatus 200 may access one or more third party circuitries via any sort of networked connection that facilitates transmission of data and electronic information between the apparatus 200 and the third-party circuitries. In turn, apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Figure 3:
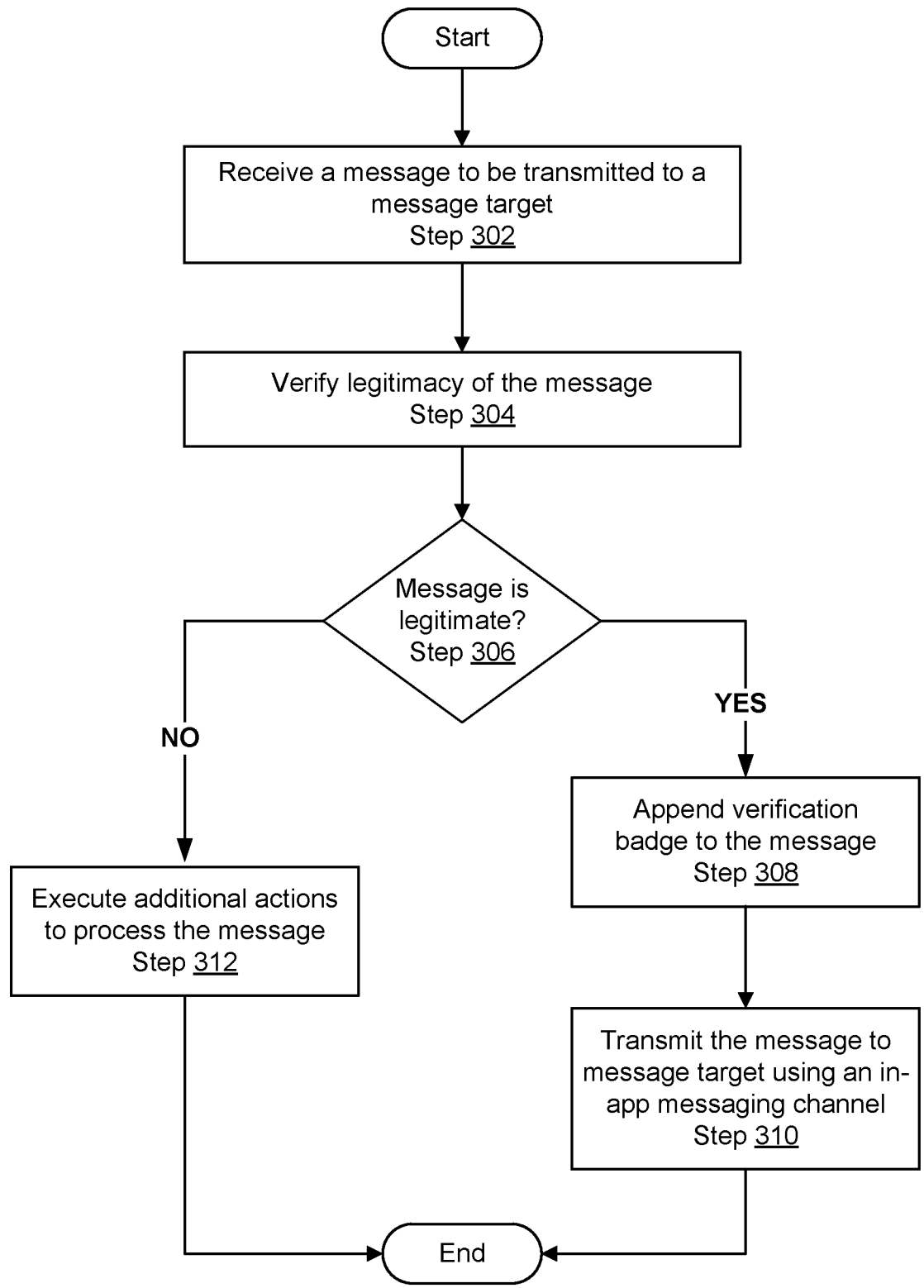
FIG. 3 illustrates an example flowchart for processing third-party communications, in accordance with some example embodiments described herein.

Turning to FIG. 3, example flowcharts are illustrated that contain example operations implemented by example embodiments described herein. The operations illustrated in FIG. 3 may, for example, be performed by system device 104 of the verification manager 102 shown in FIG. 1, which may in turn be embodied by apparatus 200 shown and described in connection with FIG. 2. To perform the operations described below, the apparatus 200 may utilize one or more of processor 202, memory 204, communications hardware 206 including input-output circuitry, verification engine 208, badge generation engine 210, and in-app messaging engine 212, and/or any combination thereof. It will be understood that user interaction with the verification manager 102 may occur directly via input-output circuitry of the communications hardware 206, or may instead be facilitated by a separate computing device, within environment 100 shown in FIG. 1, having similar or equivalent physical componentry facilitating such user interaction.

Turning now to FIG. 3, example operations (e.g., steps) are shown for processing third-party communications.

As shown by Step 302, the apparatus 200 includes means, such as communications hardware 206, or the like, for receiving a message to be transmitted to a message target. In some embodiments, the message may be a form of electronic communications such as: an SMS message, an iMessage®, an email, or the like. The message may be transmitted across a communications network (e.g., communications network 106, FIG. 1) from a message source device (e.g., message source device 108, FIG. 1). The communications hardware 206 of the apparatus may receive the message using one or more of the input-output circuitry (e.g., ingress and egress ports, or the like) of the communications hardware 206.

In some embodiments, the message may be transmitted (e.g., by the message source device) in the form of a data packet including at least a data packet header and a data packet payload. The data packet header may include any combination of: an IP address of the message source device, additional IP addresses of other devices that routed the data packet between the message source device and the apparatus 200, a name of the entity operating the message source device, an IP address of the apparatus 200, an IP address of the message target device, information indicating a final recipient of the message (e.g., an email address, name, phone number, unique identification (ID) number, or the like, or the final recipient of the message), or the like. The data packet payload may include a content of the message such: one or more characters and numbers forming texts (e.g., words, hyperlinks, or the like.), one or more graphics (e.g., a logo of the entity that generated the message, pictures of a product, or the like), or the like.

In some or more embodiments, the unique ID number of the final recipient of the message may be generated by the apparatus 200 (e.g., by the verification engine 208 of the apparatus 200). The unique ID number may be any combination of numbers, letters, and special characters that is uniquely tied to the final recipient of the message, and may be used to replace other information (e.g., an email, a telephone number, or the like) of the final recipient. For example, assume that the message is sent by a utility company to an individual (i.e., the final recipient) and that the apparatus 200 is operated by a trusted source (e.g., a bank) of the individual. In this example, the utility company would only have to include the unique ID number of the individual within the message. Once received by the bank, the bank may use the unique ID number to determine an identity of the individual within the bank's list of customers.

In some embodiments, before the apparatus 200 can receive the message, the final recipient of the message would have had to direct the message source device (more specifically, the entity operating the message source device) to first transmit the message to the apparatus 200. Assuming the same scenario above where the message source device is operated by a utility company and the apparatus 200 is operated by a bank, in one example, the individual may register the utility company under the individual's customer profile at the bank. The bank may then issue (e.g., using verification engine 208 of the apparatus 200) a set of contact information (e.g., an email, a telephone number, or the like) for the individual to provide to the utility company. Alternatively, the bank could also directly send the set of contact information to the utility company (e.g., using communications hardware 206 of the apparatus 200 to transmit the set of contact information to the message source device) with instructions for the utility company to use the provided set of contact information whenever the utility company wishes to send any electronic communications to the individual. The set of contact information provided by the bank identifies the bank as the initial recipient of a message to be sent to the individual.

Although specific examples are described above, one or more embodiments disclosed herein are not limited to these specific examples. A person having ordinary skill in the art would appreciate that other methods and processes can be used for directing the message source device to transmit the message to the apparatus 200 as long as the message is not directly transmitted from any third-party entities to the individual without first going through the trusted source (e.g., apparatus 200).

As shown by Steps 304 and 306, the apparatus 200 includes means, such as verification engine 208, or the like, for verifying a legitimacy of the message received in Step 302. In some embodiments, the verification engine 208 may parse the message (e.g., parse the data packet header and data packet payload making up the message) to identify one or more components within the message that could be used to indicate whether the message is legitimate or illegitimate (e.g., a scam message).

For example, in some embodiments, the verification engine 208 may parse the data packet header of the message to identify an IP address of the message source device. The verification engine 208 may then parse an approved IP address list (e.g., a data structure stored in memory 204 of apparatus 200 containing a list of IP address associated with approved, verified, and/or trusted third parties) to determine whether the IP address included in the data packet header of the message matches any IP addresses included in the approved headers list. In some embodiments, in an instance where the identified IP address does not match any IP address on the approved IP address list, the verification engine 208 may parse the identified IP address to determine an origin (e.g., a geographical origin) of the IP address.

Continuing with the above example of using IP addresses for verification, in some embodiments, if the message was relayed through the communications network by multiple devices (e.g., switches, nodes, or the like), multiple IP addresses may be included in the data packet header of the message. The verification engine 208 may then determine, from among the IP addresses, an IP address of the very first device from which the message was transmitted. More specifically, bad actors (e.g., scam artists) may route a message through another device (e.g., a device operated by a trusted third party) to make it seem like the message was transmitted from the device operated by a trusted third party. Analyzing all IP addresses from which the message passed through before being received by the apparatus 200 would ensure that all of the IP addresses are associated with legitimate (e.g., trusted) sources.

As another example, in some embodiments, the verification engine 208 may parse (e.g., using natural language processing (NPL) techniques, or the like) the data packet payload of the message to check a content of the message.

More specifically, the verification engine 208 may check a content of the message for any information (e.g., short-form URLs, graphics such as logos, instructions included in the message, or the like) that could raise suspicion about the legitimacy of the message. For example, the verification engine 208 may mark instructions such as "Please click on the following link to update your social security number" included with a short-form URL as the link could be marked as suspicious.

Continuing with the above example of using the content of the message for verification, the verification engine 208 may also compare all URLs (all short and long form URLs) included in a message's content to URLs included in an approved URL list (e.g., a data structure stored in memory 204 of apparatus 200 containing a list of URLs associated with approved, verified, and/or trusted third parties).

As yet another example, in some embodiments, the verification engine 208 may determine (e.g., through information retrieved from the communications hardware 206) a time at which the message was received by the apparatus 200 at Step 302. In particular, a time at which the message was received could be used as an indicator for determining whether the message is legitimate. For example, the trusted source may have an agreement with each trusted third party that each trusted third party may only transmit messages to the individual within a certain period of time during the day. Said another way, each trusted third party would be assigned with a block of time (e.g., a 30 minute, 1-hour, 2-hour, or the like period), and that any messages transmitted outside of the assigned block of time may be marked as suspicious.

In some embodiments, in addition to using the above-discussed IP address, message content, and message receipt time, the verification engine 208 may further reference a predetermined set of verification rules. The predetermined set of verification rules may be configured by the trusted source and specify one or more requirements for verifying a message as legitimate. The requirements may be based on any combination of the IP address, message content, and/or message receipt time verification results. As one example, a requirement included in the predetermined set of verification rules may indicate that, for a message to be verified as legitimate, the message cannot include any IP addresses that do not match those included in the approved IP address list. Other requirements may be set based on the preferences of the trusted source operating the apparatus 200.

In some embodiments, in an instance where the verification engine 208 (using the predetermined set of verification rules in combination with any or all of the above-discussed factors) determines (e.g., verifies) that the message received in Step 302 is legitimate (i.e., YES in Step 306), the operations of FIG. 3 proceeds to Step 308, as discussed in more detail below. Alternatively, in an instance where the verification engine 208 (using the predetermined set of verification rules in combination with any or all of the above-discussed factors) determines (e.g., verifies) that the message received in Step 302 is not legitimate (i.e., NO in Step 306) (e.g., that the message is suspicious), the operations of FIG. 3 proceeds to Step 312, as discussed in more detail below.

As shown by Step 308, the apparatus 200 includes means, such as badge generation engine 210, or the like, for appending a badge (e.g., a verification badge) onto the message received in Step 302 to obtain a verified messaged. In some embodiments, the badge generation engine 210 may generate the verification badge in response to receiving instructions from the verification engine 208 after the verification engine 208 has determined that the message is legitimate (e.g., as discussed above in Steps 304 and 306). Appending the verification badge onto the message may involve adding the verification badge to a content of the message such that the badge may be visually seen by the final recipient of the message. The visual verification badge appended to the message would show a final recipient of the message that the message is a verified message.

In some embodiments, the verification badge may comprise one or more of: a logo of the trusted source, an indicator (e.g., a short message) indicating that the message is verified by the trusted source, or the like. Multiple verification badges may be appended to the message without departing from the scope of one or more embodiments disclosed herein.

As shown by Step 310, the apparatus 200 includes means, such as in-app messaging engine 212, or the like, for transmitting the message appended with the verification badge (e.g., by the badge generation engine 210) to the message target device using an in-app messaging channel. In some embodiments, the in-app messaging channel may be a component of an application (e.g., a web-based application, a mobile application, or the like) operated and managed (e.g., hosted) by the trusted source. The in-app messaging channel may connect the in-app messaging engine 212 to a portion of the application configured to receive and display emails and/or text messages (also referred to herein as "a native in-app message center").

In some embodiments, the native in-app message center may only be accessed (e.g., by the individual) upon execution of the application on the message target device. Execution of the application on the message target device may require the user to log into (e.g., using single sign-on (SSO)) or multifactor authentication (MFA) to access the application with the user's credentials (e.g., a username and password created by the user or assigned by the trusted source, fingerprint, voice, facial recognition or the like). For example, assume that the trusted source is a bank. The application in this example would be a web-based and/or mobile based online banking application created and maintained by the bank. Said online banking application would include a native in-app message center for the bank to securely transmit messages and/or notifications to the user in the form of emails and/or text messages. The in-app messaging engine 212 would transmit the verified message appended with the verification badge to the message target device such that the verified message would show up (e.g., be displayed) in the native in-app message center of the online banking application as an email or text message notification from the bank. Such displaying of the verified message in the native in-app message center of the online banking application not only shows the individual that the message has been verified by the trusted source (e.g., the bank) but also makes it appear as though the bank is the source of the message (albeit the bank only forwarding the message), which advantageously associates the message with a higher level of trust, security, and safety compared to the message being received as a regular text or email directly from the third part that initially generated the message.

In some embodiments, even though the verified message is shown (e.g., displayed) in the native in-app message center, the sender of the verified message may still be shown as the original sender (e.g., the entity associated with the message source device). Said another way and using the above utility provider and bank example, the verified message will be displayed in the online banking application's native in-app message center as a message from the utility provider (rather than being a message from the bank).

In some embodiments, before transmitting the message, the in-app messaging engine 212 may format the message into a format compatible with the native in-app message center. For example, if the message received in Step 302 is received in a format of a text message (e.g., an SMS message) but ultimately would be displayed as an email in the native in-app message center, the in-app messaging engine 212 may format the message from the text format into an email format.

As shown by Step 312, the apparatus 200 includes means, such as verification engine 208, or the like, for executing additional actions to process messages that have been determined (e.g., in Step 306 of FIG. 3) as being suspicious and/or messages that cannot be conclusively verified as legitimate (hereinafter referred to collectively as "messages that failed an initial verification").

In some embodiments, the verification engine 208 may be configured to immediately delete any and all of the messages that failed the initial verification from (e.g., memory 204) of the apparatus 200. Alternatively, the verification engine 208 may cause the apparatus 200 to display (e.g., using communications hardware 206) instructions for one or more users of the apparatus 200 to intervene with the verification process. Said another way, rather than directly deleting any and all of the messages that failed the initial verification, the verification engine 208 will trigger human intervention to perform a secondary assessment of the messages that failed the initial verification. For example, the verification engine 208 may instruct a user of the apparatus 200 (e.g., via a display connected to the apparatus) to verify: a content of the message, a sender of the message, a timing at which the message was sent, or the like. More specifically, as part of verifying a sender of the message, the verification engine 208 may instruct the user of the apparatus 200 to call (e.g., via telephone) the sender (e.g., the utility provider discussed in the above examples) of the message to confirm whether the utility provider is the actual sender of the message. In addition to the instructions for the user of the apparatus 200 to call the sender of the message, the verification engine 208 may also generate one or more security questions for the user of the apparatus 200 to ask the sender as an additional step of security and verification.

In some embodiments, in addition to the human intervention, the verification engine 208 may transmit (e.g., before immediately deleting a message that failed the initial verification) an additional verification request to the message source device. The additional verification request may include one or more instructions for the entity associated with the message source device (e.g., the utility provider discussed in the above examples) to contact (e.g., via a direct telephone call, or the like) the trusted source to verify that the utility provider is the actual sender of the message.

In some embodiments, any of the messages that failed the initial verification that could be verified as legitimate after the human intervention has been triggered would be flagged as legitimate. In this instance, the verification engine 208 may receive (e.g., from communications hardware 206) user instructions to process these messages as verified messages (e.g., process these messages using the above-discussed processes in Steps 308 and 310). Alternatively, any of the messages that failed the initial verification that could not be verified as legitimate after the human intervention has been triggered would be flagged for deletion. In this instance, the verification engine 208 may receive (e.g., from communications hardware 206) user instructions to delete such messages that even a human user cannot verify as legitimate.

As described above, example embodiments provide methods and apparatuses that provide improved trust, security, and safety for electronic communications received from third-party entities (e.g., restaurants, utility providers, or the like). Example embodiments also provide tools that overcome the problems faced by conventional electronic communications technology by allowing a trusted source to first verify messaged transmitted by third-party entities and then display the verified messages in one or more applications (e.g., mobile applications, web-based applications, or the like) managed and operated by the trusted source.

As these examples all illustrate, example embodiments contemplated herein provide technical solutions that solve real-world problems faced with the use of electronic communications. In particular, advancements in technology have enabled bad actors (e.g., scam artists) to more easily deceive individuals (e.g., through use of deceptive text messages, phishing emails, or the like) into providing sensitive information (e.g., personal identity information, financial information, or the like). In fact, in the year twenty-twenty (2020) alone, nearly $86 million was reported lost from frauds originating in scam texts. At the same time, the recently arising ubiquity of the above-discussed problem has unlocked new avenues to solving this problem that historically were not available, and example embodiments described herein thus represent a technical solution to these real-world problems.

FIG. 3 illustrates operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving, by communications hardware, a data packet comprising an electronic message to be transmitted to a target electronic device, wherein the electronic message is at least one of an email or text message indicating a first entity;
   determining, by a verification engine, that the electronic message is legitimate, at least in part, by:
      determining an assigned messaging time associated with the first entity, and
      verifying that a time of the electronic message is within the assigned messaging time;
   generating, by a badge generation engine, a verified electronic message by appending a verification badge to the electronic message;
   transmitting, by an in-app messaging engine and via a secured in-app messaging channel, the verified electronic message to the target electronic device to be displayed on a screen of the target electronic device via an application executing on the target electronic device;
   receiving, by the communications hardware, a second data packet comprising a second electronic message to be transmitted to the target electronic device, wherein the second electronic message is at least one of an email or text message indicating the first entity;
   determining, by the verification engine, that the second electronic message is illegitimate, at least in part, by:
      determining the assigned messaging time associated with the first entity, and
      verifying that a time of the second electronic message is outside of the assigned messaging time;
   transmitting, by the verification engine, an additional verification request to a source electronic device that transmitted the second electronic message; and
   deleting, by the verification engine and based on determining that the second electronic message is illegitimate, the second electronic message.

2. The method of claim 1, wherein:
   the data packet is received from the source electronic device, and
   determining that the electronic message is legitimate further comprises executing, by the verification engine:
      verifying, based on a data packet header of the data packet, an internet protocol (IP) address of the source electronic device; and
      verifying a first content of the electronic message.

3. The method of claim 2, wherein:
   the secured in-app messaging channel is associated with the first entity,
   the source electronic device is associated with a second entity different from the first entity, and
   the verification badge comprises a logo of the first entity and an indicator indicating that the electronic message is verified by the first entity.

4. The method of claim 3, wherein:
   the data packet is transmitted by the in-app messaging engine to a native in-app message center of the application executing on the target electronic device, and
   the application executing on the target electronic device is hosted by the first entity.

5. The method of claim 4, wherein accessing a second content of the application requires completion of a single sign-on (SSO) or multi-factor authentication (MFA), and wherein the second content of the application comprises the native in-app message center.

6. The method of claim 5, wherein the application is a mobile application or a web-based application.

7. The method of claim 6, wherein the application is an online banking application, and wherein the native in-app message center in an internal mailing system of the online banking application.

8. The method of claim 1, wherein:
   the secured in-app messaging channel is associated with the first entity,
   the source electronic device is associated with a second entity different from the first entity, and
   the additional verification request comprises instructions for the second entity to verify a legitimacy of the second electronic message by calling the first entity.

9. An apparatus comprising:
   communication hardware configured to receive a data packet comprising an electronic message to be transmitted to a target electronic device, wherein the electronic message is at least one of an email or text message indicating a first entity;
   a verification engine configured to determine that the electronic message is legitimate, at least in part, by:
      determining an assigned messaging time associated with the first entity, and
      verifying that a time of the electronic message is within the assigned messaging time;
   a badge generation engine configured to generate a verified electronic message by appending a verification badge to the electronic message;
   an in-app messaging engine configured to transmit, via a secured in-app messaging channel, the verified electronic message to the target electronic device to be displayed on a screen of the target electronic device via an application executing on the target electronic device, and wherein the communication hardware is further configured to receive a second data packet comprising a second electronic message to be transmitted to the target electronic device, wherein the second electronic message is at least one of an email or text message indicating the first entity,
wherein the verification engine is further configured to:
determine that the second electronic message is illegitimate, at least in part, by:
determining the assigned messaging time associated with the first entity, and
verifying that a time of the second electronic message is outside of the assigned messaging time;
transmit an additional verification request to a source electronic device that t
transmitted the second electronic message; and
delete, based on determining that the second electronic message is illegitimate, the second electronic message.

10. The apparatus of claim 9, wherein:
the data packet is received from the source electronic device, and determining that the electronic message is legitimate further comprises the verification engine being further configured to execute:
verifying, based on a data packet header of the data packet, an internet protocol (IP) address of the source electronic device; and
verifying a content of the electronic message.

11. The apparatus of claim 10, wherein:
the secured in-app messaging channel is associated with the first entity,
the source electronic device is associated with a second entity different from the first entity, and
the verification badge comprises a logo of the first entity and an indicator indicating that the electronic message is verified by the first entity.

12. The apparatus of claim 11, wherein:
the in-app messaging engine is configured to transmit the data packet to a native in-app message center of the application executing on the target electronic device, and
the application executing on the target electronic device is hosted by the first entity.

13. The apparatus of claim 12, wherein accessing a second content of the application requires completion of a single sign-on (SSO) or multi-factor authentication (MFA), and wherein the content of the application comprises the native in-app message center.

14. A computer program product comprising at least one non-transitory computer-readable storage medium storing software instructions that, when executed, cause an apparatus to:
receive a data packet comprising an electronic message to be transmitted to a target electronic device, wherein the electronic message is at least one of an email or text message indicating a first entity;
determine that the electronic message is legitimate, at least in part, by:
determining an assigned messaging time associated with the first entity, and
verifying that a time of the electronic message is within the assigned messaging time;
generate, a verified electronic message by appending a verification badge to the electronic message;
transmit, via a secured in-app messaging channel, the verified electronic message to the target electronic device to be displayed on a screen of the target electronic device via an application executing on the target electronic device;
receive a second data packet comprising a second electronic message to be transmitted to the target electronic device, wherein the second electronic message is at least one of an email or text message indicating the first entity;
determine that the second electronic message is illegitimate, at least in part, by:
determining the assigned messaging time associated with the first entity, and
verifying that a time of the second electronic message is outside of the assigned messaging time;
transmit an additional verification request to a source electronic device that transmitted the second electronic message; and
delete, based on determining that the second electronic message is illegitimate, the second electronic message.

15. The computer program product of claim 14, wherein:
the data packet is received from the source electronic device, and
determining that the electronic message is legitimate further comprises executing:
verifying, based on a data packet header of the data packet, an internet protocol (IP) address of the source electronic device; and
verifying a content of the electronic message.

16. The computer program product of claim 15, wherein:
the secured in-app messaging channel is associated with the first entity,
the source electronic device is associated with a second entity different from the first entity, and
the verification badge comprises a logo of the first entity and an indicator indicating that the electronic message is verified by the first entity.

17. The computer program product of claim 16, wherein:
the data packet is transmitted to a native in-app message center of the application executing on the target electronic device, and
the application executing on the target electronic device is hosted by the first entity.

18. The computer program product of claim 17, wherein accessing a second content of the application requires completion of a single sign-on (SSO) or multi-factor authentication (MFA), and wherein the content of the application comprises the native in-app message center.

19. The computer program product of claim 17, wherein the application is a mobile application or a web-based application.

20. The computer program product of claim 19, wherein the application is an online banking application, and wherein the native in-app message center in an internal mailing system of the online banking application.

* * * * *